UNITED STATES PATENT OFFICE.

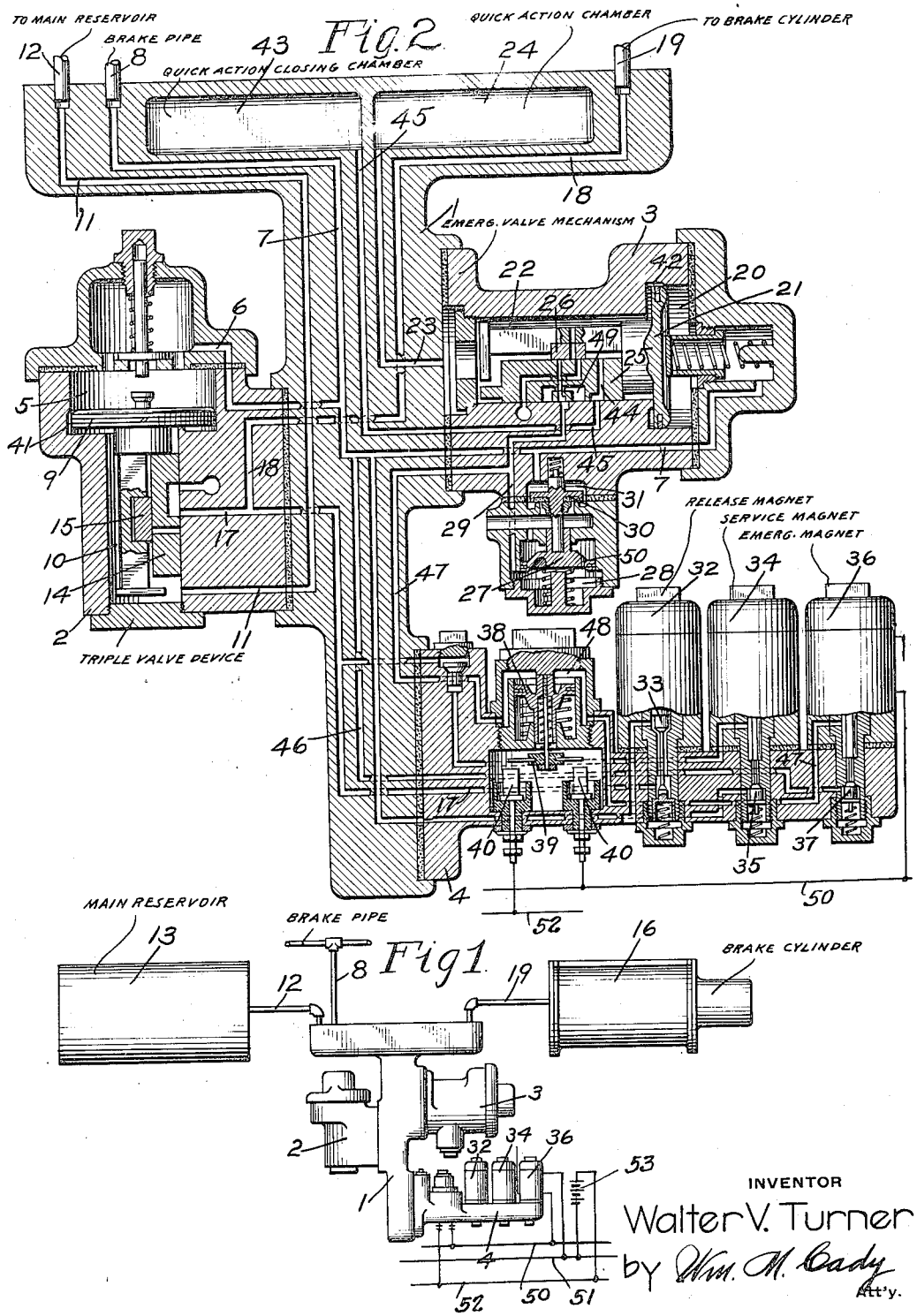

WALTER V. TURNER, OF WILKINSBURG, PENNSYLVANIA, ASSIGNOR TO THE WESTINGHOUSE AIR BRAKE COMPANY, OF WILMERDING, PENNSYLVANIA, A CORPORATION OF PENNSYLVANIA.

ELECTROPNEUMATIC BRAKE.

1,297,511.    Specification of Letters Patent.    Patented Mar. 18, 1919.

Application filed April 17, 1917. Serial No. 162,677.

*To all whom it may concern:*

Be it known that I, WALTER V. TURNER, a citizen of the United States, residing at Wilkinsburg, in the county of Allegheny and State of Pennsylvania, have invented new and useful Improvements in Electropneumatic Brakes, of which the following is a specification.

This invention relates to fluid pressure brakes, and more particularly to an electrically controlled fluid pressure brake.

It has heretofore been proposed to provide an electro-fluid pressure brake equipment in which an emergency magnet controlled valve is employed for venting fluid from the brake pipe to effect an emergency application of the brakes. A quick action valve mechanism is also provided on each car which operates in an emergency application of the brakes to effect a local reduction in brake pipe pressure.

The operation of the emergency magnets may be effected by manipulation of the brake valve or by some outside means, such as by the release of the controller handle. If, however, the operation of the emergency magnets is effected by means other than the brake valve, the brake valve is very likely to be in running position, release position, or other position, in which fluid is supplied to the brake pipe.

After a predetermined time, the quick action valve is designed to close and cut off the further venting of fluid from the brake pipe, and when this happens, the brake pipe may then be supplied with fluid from the brake valve at a greater rate than the emergency magnet valves are able to vent fluid therefrom, with the result that the brakes may be released, while the emergency magnets are still energized.

The principal object of my invention is to provide means for preventing the release of the brakes so long as the emergency magnet valves are open.

In the accompanying drawing; Figure 1 is a diagrammatic view of a car brake equipment embodying my invention; and Fig. 2 a central sectional view of the electro-pneumatic brake controlling valve device.

The brake controlling valve device may comprise a pipe bracket 1 having secured thereto a triple valve device 2, an emergency valve mechanism 3, and an electro-magnetic valve control device 4.

The triple valve device comprises a casing having a piston chamber 5 connected by passages 6 and 7 to brake pipe 8 and containing piston 9 and having a valve chamber 10 connected by passage 11 and pipe 12 to an auxiliary reservoir 13 and containing a main slide valve 14 and a graduating valve 15 for controlling the admission and release of fluid to and from the brake cylinder 16 through passages 17 and 18 and pipe 19.

The emergency valve mechanism may comprise a casing having a piston chamber 20 connected to brake pipe passage 7 and containing a piston 21 and having a valve chamber 22 connected by a passage 23 with a quick action chamber 24 and containing a slide valve 25 and an auxiliary valve 26 adapted to be operated by piston 21.

The emergency valve mechanism also includes a quick action valve device comprising a piston 27 contained in piston chamber 28 connected to a passage 29 leading to the seat of slide valve 25, and a vent valve 30 contained in a valve chamber 31 connected to brake pipe passage 7.

The electro-pneumatic control portion 4 may comprise a release magnet 32 for operating a release valve 33, a service magnet 34 for operating a valve 35, an emergency magnet 36 for operating a valve 37, and an emergency switch device comprising a piston 38 for operating a movable contact 39 adapted to engage fixed contacts 40 connected into the circuit of the emergency magnet 36.

In operation, fluid supplied to the brake pipe 8 flows through passage 7 to piston chamber 5 and thence through feed groove 41 to valve chamber 10, charging the auxiliary reservoir 13. Fluid also flows through passage 7 to emergency piston chamber 20 and thence through feed groove 42 to valve chamber 22, charging the quick action chamber 24 with fluid under pressure. With the emergency slide valve 25 in release position, as shown in the drawing, the quick action charging chamber 43 is charged from valve chamber 22 through port 44 and passage 45.

As in my prior Patent No. 1,063,623, dated June 3, 1913, the terminals of the emergency magnet 36 are connected to train wires 51 and 52 and the terminals of the emergency switch contacts 49 are connected to train wires 50 and 52, while a source of current is connected across the wires 51 and 52.

If the usual brake switch is turned to emergency position the train wires 50 and 52 will be connected together, so as to close the circuit of the emergency magnet 36 through the source of current 53, thus energizing said magnet. The valve 37 is then opened, so as to vent fluid from the brake pipe to the quick action piston chamber 28 through passage 7, passage 46, past valve 37 to passage 47 which leads to the switch piston chamber 48, and thence to passage 29.

The switch piston 38 is then actuated to close the emergency magnet circuit on each car of the train and the quick action piston 27 is operated to open vent valve 30 to effect a local reduction in brake pipe pressure.

This reduction in brake pipe pressure causes the triple valve piston 9 to shift to emergency position and also the emergency piston 21. The movement of the emergency piston causes the emergency valve to connect passage 45 through cavity 49 with passage 29, so that the quick action closing chamber 43 is connected to quick action piston chamber 28.

So long as the emergency magnet valve 37 is held in open position, fluid will be vented from the brake pipe to the quick action piston chamber 28 and to the switch piston chamber 48 and this flow of air will cause the quick action piston 27 to hold the brake pipe vent valve 30 in open position so as to vent fluid from the brake pipe and prevent the release of the brakes, even if the brake valve be in a position in which fluid is supplied to the brake pipe.

When the emergency magnet 36 is deenergized, the flow of fluid from the brake pipe to the quick action piston chamber 28 is cut off and the piston 27 will eventually return to normal position, by reason of the equalization of fluid pressures on opposite sides through the port 50 in the piston, but to obtain a quicker release it is preferable to move the brake valve to a position in which fluid is not supplied to the brake pipe or which fluid is vented from the brake pipe, such as emergency position.

By so manipulating the brake valve, the fluid pressure in quick action piston chamber 28 is quickly reduced, permitting the piston 27 to close the vent valve 30 and then by turning the brake valve to release position, the brake pipe pressure can be rapidly increased so as to effect the quick release of the brakes.

Having now described my invention, what I claim as new and desire to secure by Letters Patent, is:

1. In an electro-pneumatic brake, the combination with a brake pipe, a valve for venting fluid from the brake pipe, and a piston operated upon an increase in fluid pressure on one side for opening said valve and having means for equalizing the fluid pressures on opposite sides thereof, of a magnet controlled valve for venting fluid from the brake pipe to said piston to effect an emergency application of the brakes.

2. In an electro-pneumatic brake, the combination with a brake pipe, a valve for venting fluid from the brake pipe, and a piston operated upon an increase in fluid pressure for opening said valve, of a valve for venting fluid from the brake pipe to said piston, a magnet for operating said valve, a switch for controlling the circuit of said magnet, and a piston operated by fluid vented from the brake pipe for operating said switch.

In testimony whereof I have hereunto set my hand.

WALTER V. TURNER.